US012707275B2

(12) United States Patent

Jayawardene et al.

(10) Patent No.: US 12,707,275 B2

(45) Date of Patent: Aug. 11, 2026

(54) COMMON SPECTRUM MANAGEMENT IN COEXISTING WIRELESS NETWORKS

(71) Applicant: Charter Communications Operating, LLC, St. Louis, MO (US)

(72) Inventors: Diwelawatte P. Jayawardene, Centennial, CO (US); Manish Jindal, Lone Tree, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 516 days.

(21) Appl. No.: 18/324,347

(22) Filed: May 26, 2023

(65) Prior Publication Data

US 2024/0397334 A1 Nov. 28, 2024

(51) Int. Cl.

*H04W 16/14* (2009.01)
*H04L 5/00* (2006.01)
*H04W 16/10* (2009.01)
*H04W 48/04* (2009.01)

(52) U.S. Cl.

CPC ........... *H04W 16/14* (2013.01); *H04L 5/0094* (2013.01); *H04L 5/0096* (2013.01); *H04W 16/10* (2013.01); *H04W 48/04* (2013.01)

(58) Field of Classification Search

CPC ..... H04W 16/14; H04W 16/10; H04W 48/04; H04W 5/0096; H04W 28/16; H04L 5/0094; H04L 5/0098

See application file for complete search history.

(56) References Cited

U.S. PATENT DOCUMENTS

| | | | | |
|---|---|---|---|---|
| 2013/0301609 A1* | 11/2013 | Smith | H04W 16/14 370/329 |
| 2015/0181601 A1* | 6/2015 | Schmidt | H04W 16/14 370/329 |
| 2016/0066192 A1* | 3/2016 | Markwart | H04W 12/08 455/454 |
| 2018/0332660 A1* | 11/2018 | Mueck | H04W 76/18 |
| 2019/0058999 A1* | 2/2019 | Gunasekara | H04W 16/14 |

* cited by examiner

*Primary Examiner* — Shukri Taha

(74) *Attorney, Agent, or Firm* — Dority & Manning, P.A.

(57) ABSTRACT

A central computing device receives, from a first entity computing system associated with a first entity, a first indication that the first entity requires use of a subband of a band of wireless spectrum, the first indication including a subband identifier that identifies the subband, a geographic location, and a time indicator that indicates when the subband is needed. The central computing device sends to a second entity computing system associated with a second entity, first instructions to stop use of the subband in the geographic location.

20 Claims, 10 Drawing Sheets

COMMON SPECTRUM MANAGEMENT IN COEXISTING WIRELESS NETWORKS

BACKGROUND

Wireless spectrum is a finite resource, and the increasing demand for wireless communications requires increased efficiency in the utilization of the wireless spectrum.

SUMMARY

The embodiments disclosed herein implement common spectrum management in coexisting wireless networks.

In one embodiment a method is provided. The method includes receiving, by a central computing device from a first entity computing system associated with a first entity, a first indication that the first entity requires use of a subband of a band of wireless spectrum, the first indication including a subband identifier that identifies the subband, a geographic location, and a time indicator that indicates when the subband is needed. The method further includes sending, by the central computing device to a second entity computing system associated with a second entity, first instructions to stop use of the subband in the geographic location.

In another embodiment a computing device is provided. The computing device includes a memory, and a processor device coupled to the memory, the processor device operable to receive, from a first entity computing system associated with a first entity, a first indication that the first entity requires use of a subband of a band of wireless spectrum, the first indication including a subband identifier that identifies the subband, a geographic location, and a time indicator that indicates when the subband is needed. The processor device is further operable to send, to a second entity computing system associated with a second entity, first instructions to stop use of the subband in the geographic location.

In another embodiment a non-transitory computer-readable storage medium is provided. The non-transitory computer-readable storage medium includes executable instructions operable to cause a processor device to receive, from a first entity computing system associated with a first entity, a first indication that the first entity requires use of a subband of a band of wireless spectrum, the first indication including a subband identifier that identifies the subband, a geographic location, and a time indicator that indicates when the subband is needed. The instructions are further operable to cause the processor device to send, to a second entity computing system associated with a second entity, first instructions to stop use of the subband in the geographic location.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
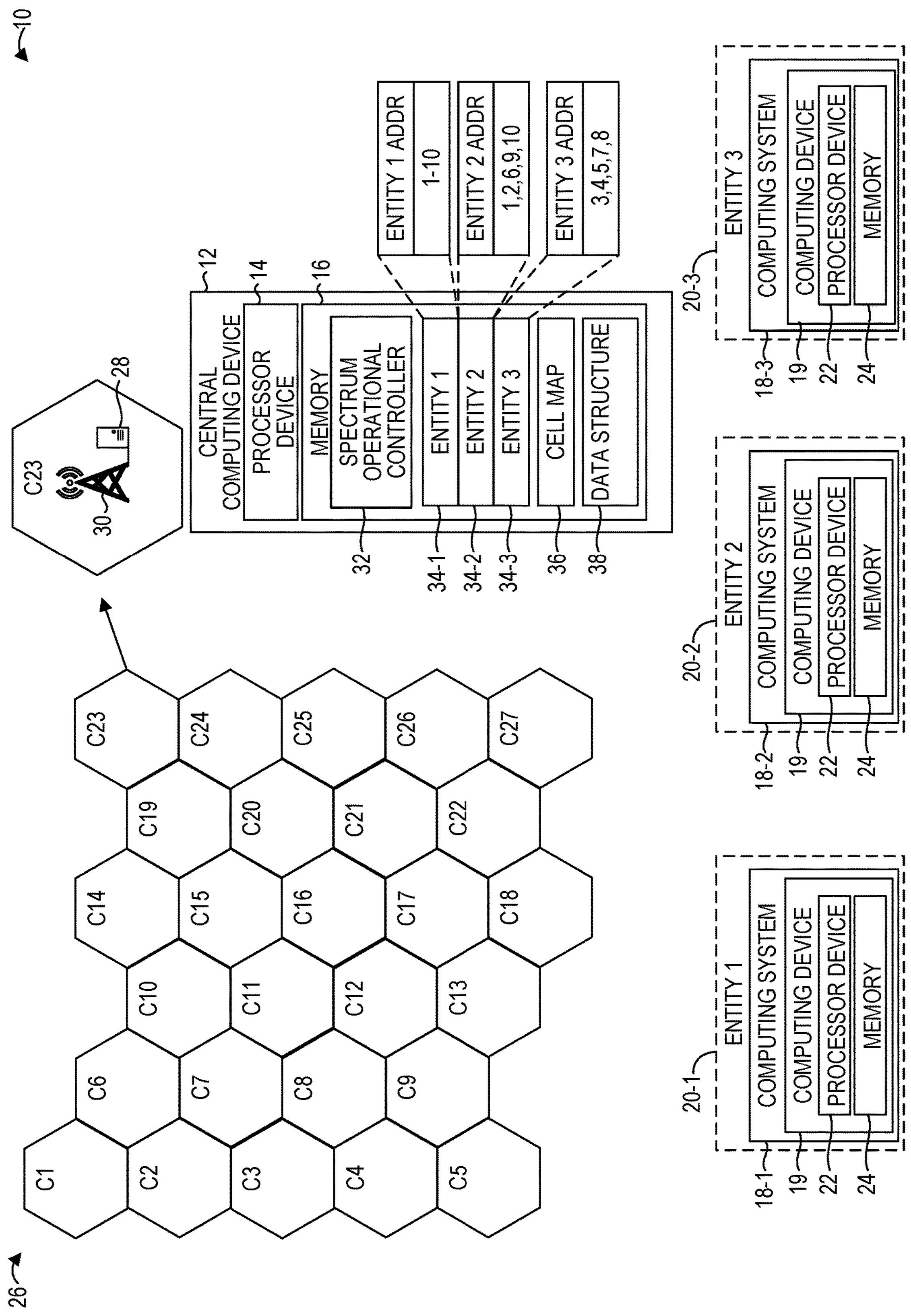
FIGS. 1A-1D are block diagrams of an environment in which common spectrum management in coexisting wireless networks can be practiced according to some embodiments.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Wireless spectrum is a finite resource, and the increasing demand for wireless communications requires increased efficiency in the utilization of the wireless spectrum. Usage rights to a band of wireless spectrum in a geographic area may be subdivided into multiple subbands that can be used concurrently by different entities without interference. There are situations in which a priority user of the wireless spectrum, such as the government, requires immediate access to one or more subbands within the band of wireless spectrum. As an example, a ship-borne, air-borne, or ground-borne radar system may need immediate access to a particular subband. Currently, when this need arises, the entire band of wireless spectrum is immediately cleared for the use of the priority user, even though the priority user will utilize only a subband of the band of wireless spectrum.

The embodiments disclosed herein implement common spectrum management in coexisting wireless networks. A first entity authorized to use a band of wireless spectrum requires use of a subband of the wireless spectrum. One or more other entities may be authorized to use the subband of wireless spectrum. The first entity sends an indication that the first entity requires use of the subband, the indication including a subband identifier that identifies the subband, a geographic location, and a time indicator that indicates when the first entity requires use of the subband. A computing device receives the indication and, in response, sends instructions to a second entity to stop use of the subband in the geographic location. The time indicator may indicate an immediate need for the subband, or may indicate a future need for the subband. The instructions may instruct the second entity to stop use of the subband immediately, or at the future time.

Subbands within the band of wireless spectrum that are not identified in the indication may continue to be used by other entities authorized to do so concurrently with the use of the identified subband by the first entity, resulting in coexistence within the band of wireless spectrum and a much more overall efficient use of the band of wireless spectrum.

FIG. 1A is a block diagram of an environment 10 in which common spectrum management in coexisting wireless networks can be practiced according to some embodiments. The environment 10 includes a central computing device 12 that includes a processor device 14 coupled to a memory 16. The word "central" in the term "central computing device 12" does not imply any particular characteristic of the central computing device 12 and is used solely to distinguish the central computing device 12 from other computing devices discussed herein. The central computing device 12 communicates with a plurality of computing systems 18-1-18-3 (generally, computing systems 18), each associated with a respective entity 20-1-20-3 (generally, entities 20). The entities 20 may be a government, a wireless operator, or any other entity that is authorized to utilize wireless spectrum. While for purposes of illustration only three entities 20 are illustrated, in practice, the environment 10 may include any number of entities 20.

In this example, the entity 20-1 is a government entity, and the entities 20-2-20-3 are wireless operator entities who sell wireless services, such as, by way of non-limiting example, Long Term Evolution (LTE) or 5G wireless services, to end users. Solely to distinguish the computing systems 18-1-18-3, the computing system 18-1 will be referred to as the first entity computing system 18-1; the computing system 18-2 will be referred to as the second entity computing system 18-2; and the computing system 18-3 will be referred to as the third entity computing system 18-3. The terms "second entity" and "third entity" are used solely to distinguish the two entities 20-2 and 20-3, and either of the entities 20-2 and 20-3 could be the second entity or the third entity.

Each of the computing systems 18 includes one or more computing devices 19, each of which includes a processor device 22 and a memory 24. The computing system 18-2 may be a single computing device 19 of the entity 20-2 that communicates with base stations of the entity 20-2 associated with a plurality of cells C1-C27, or may be a plurality of computing devices 19, such as a plurality of base stations associated with the cells C1-C27. Similarly, the computing system 18-3 may be a single computing device 19 of the entity 20-3 that communicates with base stations of the entity 20-3 associated with the cells C1-C27, or may be a plurality of computing devices 19, such as a plurality of base stations associated with the cells C1-C27.

The entities 20 are each authorized to use one or more bands of wireless spectrum in a geographic area 26 that comprises the plurality of cells C1-C27. Each of the cells C1-C27 is a geographic area that may, for example, be serviced by one or more pairs of a base station 28 and an antenna 30, each pair being operated by one of the entities 20. The entities 20 may utilize the same or different wireless communications technologies. For example, the entity 20-1 may utilize a radar wireless communication technology, the entity 20-2 an LTE wireless communication technology, and the entity 20-3 a 5G wireless communication technology.

Collectively, the entities 20 utilize a band of wireless spectrum that is subdivided into a plurality of smaller subbands, each of which can be used by an entity 20 concurrently with the use of a different subband by a different entity 20 in the same cell C1-C27. In this example, the band of wireless spectrum is a 100 MHz band, and there are ten subbands of 10 MHz each. Also, in this example, the entity 20-1 has been granted the primary right to utilize any of the ten subbands at any time the entity 20-1 desires. The entity 20-1 may be referred to as an incumbent. The entity 20-1, or another entity, has given the entities 20-2 and 20-3 the right to use particular subbands contingent on the agreement to stop use of any such subband upon the request of the entity 20-1.

The central computing device 12 includes a spectrum operational controller (SOC) 32 that is operable to facilitate efficient use of the band of wireless spectrum even when the entity 20-1 requires immediate use of one or more subbands of the wireless spectrum. The SOC 32 maintains entity records 34-1-34-3 (generally, entity records 34) that correspond, respectively, to the entities 20-1-20-3. The entity records 34 contain information that correlates each of a plurality of subbands of the band of wireless spectrum to a particular entity 20 of the plurality of entities 20.

The entity record 34-1 provides the address(es), such as the Internet protocol (IP) address(es) of the first entity computing system 18-1 and subband identifiers (IDs) of the subbands that the first entity 20-1 is authorized to use in the geographic area 26. In this example, the first entity 20-1 is authorized to use subbands 1-10. The entity record 34-2 provides the address(es), such as the IP address(es) of the second entity computing system 18-2, and subband IDs of the subbands that the second entity 20-2 is authorized to use in the geographic area 26. In this example, the second entity 20-2 is authorized to use subbands 1, 2, 6, 9, and 10. The entity record 34-3 provides the address(es), such as the IP address(es) of the third entity computing system 18-3, and subband IDs of the subbands that the third entity 20-3 is authorized to use in the geographic area 26. In this example, the third entity 20-3 is authorized to use subbands 3, 4, 5, 7, and 8. The SOC 32 also maintains a cell map 36 that identifies the location of each cell C1-C27.

Figure 1B:
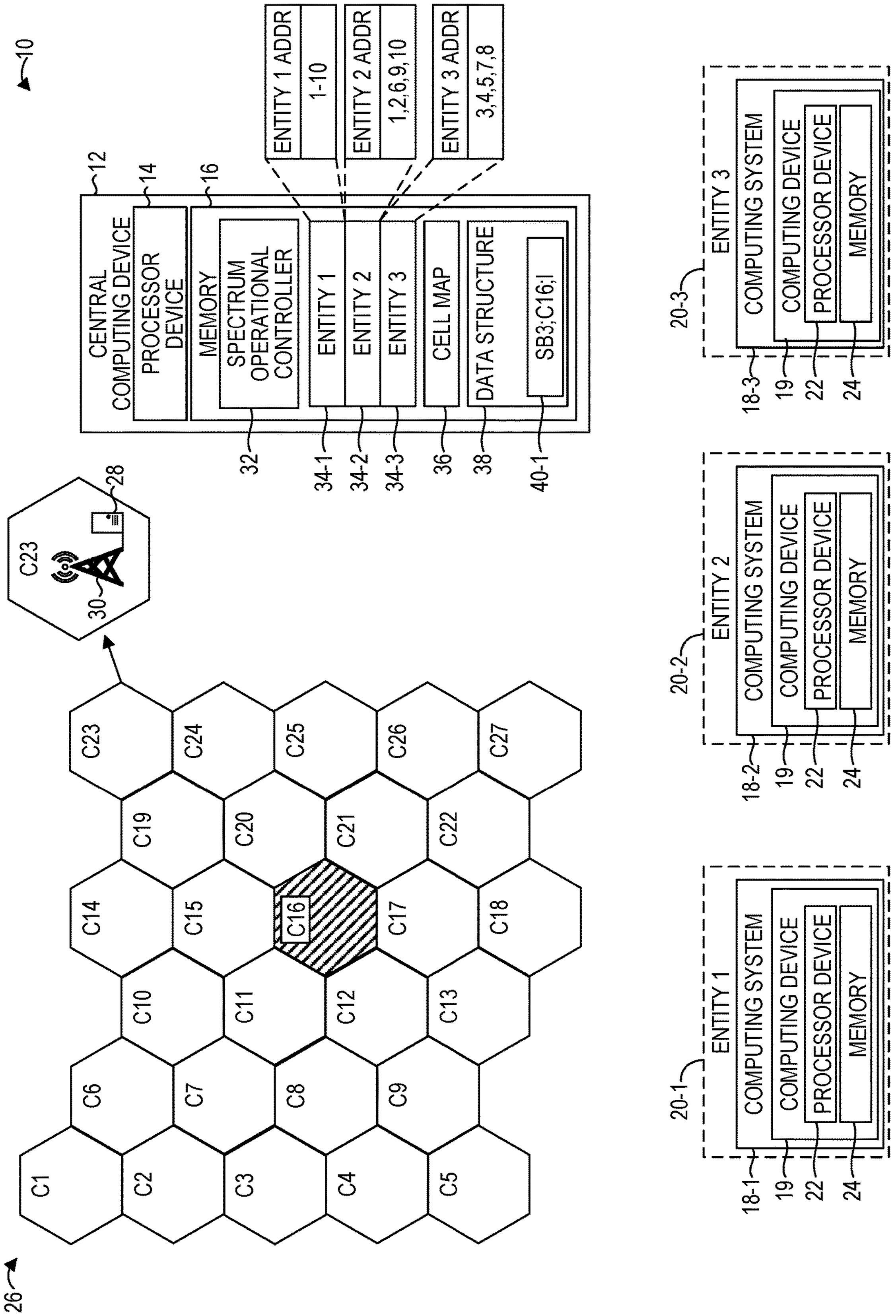

With this background, an example of common spectrum management in coexisting wireless networks will be described. Referring now to FIG. 1B, in this example assume that the entity 20-1 operates a mobile ground-based radar system. The entity 20-1 requires immediate use of subband 3 in the cell C16 to operate the radar in the frequencies of subband 3. The first entity computing system 18-1 sends an indication to the SOC 32 that the entity 20-1 requires use of the subband 3 of the wireless spectrum in the cell C16. The term "indication" as used herein refers to one or more messages. The indication includes a subband identifier that identifies the subband 3, a geographic location that identifies the cell C16, and a time indicator that indicates when the subband is needed, in this example, immediately. Optionally, the indication may include a period of time, or duration, that the entity 20-1 requires use of the subband 3, such as 10 seconds, 10 minutes, two days, or any other desirable period of time. The entity 20-1 may store an entry 40-1 in a data structure 38 that corresponds to the indication.

The SOC 32 may access the entity records 34 and determine that the entity 20-3 is the only entity 20 that may be using the subband 3 in the cell C16. The SOC 32 sends instructions to the computing system 18-3 to stop use of the subband 3 in the cell C16. In some embodiments, rather than determine a particular entity 20 that has the rights to utilize a particular subband, the SOC 32 may simply send an instruction to all entities 20 other than the entity 20-1 to stop use of the subband 3 in the cell C16.

The entity 20-3 employs the appropriate process, depending on the particular technology utilizing the subband 3, such as LTE, 5G, or the like, that causes immediate movement off of the subband 3. For example, the entity 20-3 may perform a standard 3$^{rd}$ Generation Partnership Project (3GPP) cell reselection process to identify alternative spectrum bands to resume service. In some embodiments, the SOC 32 may require the entity 20-3 to confirm, such as by an acknowledgement message, that the entity 20-3 has stopped use of the subband 3. Note that only the subband 3 in the cell C16 is affected, and usage of the cells C1-C15 and C17-27 remains unchanged.

Figure 1C:
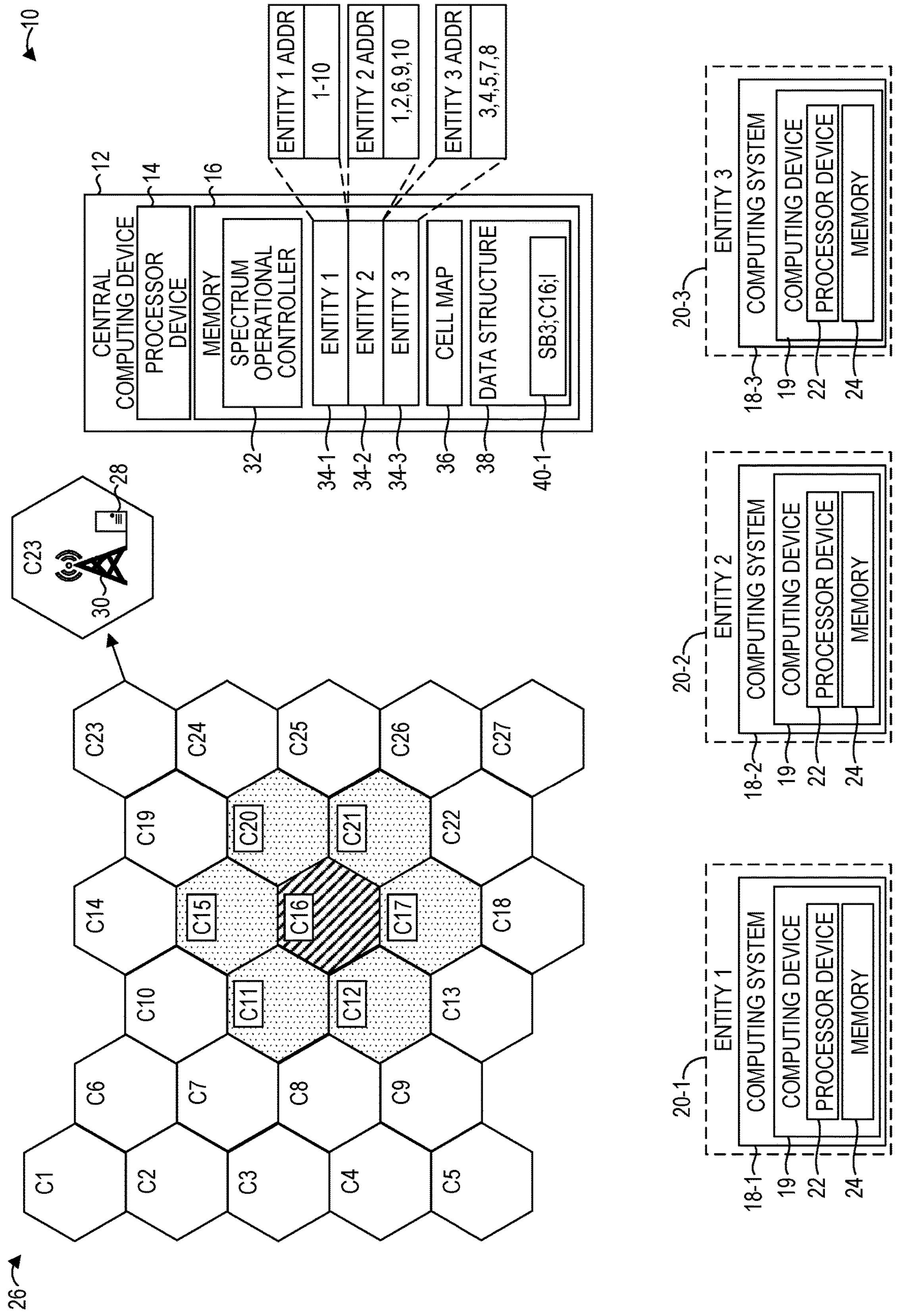

Referring now to FIG. 1C, in some embodiments, the SOC 32 may determine one or more cells that are adjacent to the cell C16, and send instructions to the third entity 20-3 via the third entity computing system 18-3 to stop use of the subband 3 in the determined cells at a future point in time. These instructions may be part of the initial instructions to halt use of the subband 3 in the cell C16 immediately, or may be sent subsequent to the initial instructions. In this example, the SOC 32 identifies each cell that is adjacent to the cell C16, specifically the cells C11, C12, C15, C17, C20, and C21. This may be done, for example, where the SOC 32 has knowledge, such as via configuration or based on historical indications, that the entity 20-1 may subsequently seek use of the same subband in adjacent cells. The instructions to the third entity 20-3 may indicate, for example, that the third entity 20-3 should stop use of the subband 3 in the cells C11, C12, C15, C17, C20, and C21 within fifteen seconds, or some other future point in time. The particular point in time may be determined, for example, based on configuration information or historical behavior of the entity 20-1. While not illustrated due to spatial limitations, the SOC 32 may generate entity records that correspond to each of the cells C11, C12, C15, C17, C20, and C21 that indicate that the third entity 20-3 has been instructed to stop use of the subband 3 in the determined cells at the future point in time, and store such entity records in the data structure 38.

In some circumstances, for example where the SOC 32 may have insight into a previous usage pattern of the first entity 20-1, the SOC 32 may determine a plurality of cells that are adjacent, or in proximity, to the cell C16, and send instructions to the third entity 20-3 via the third entity computing system 18-3 to stop immediate use of the subband 3 in a first subset of the plurality of cells, and to stop use of the subband 3 in a second subset of the plurality of cells at a future point in time.

The third entity 20-3 may cause the base stations 28 in the cells C11, C12, C15, C17, C20, and C21 to begin a process of stopping use of the subband 3 in a less immediate manner than when issued instructions to stop use of the subband 3 immediately. By way of non-limiting example, the base stations 28 may cease new device session establishment in the cells C11, C12, C15, C17, C20, and C21, and/or may implement inter-frequency handover for active sessions to other subbands.

Figure 1D:
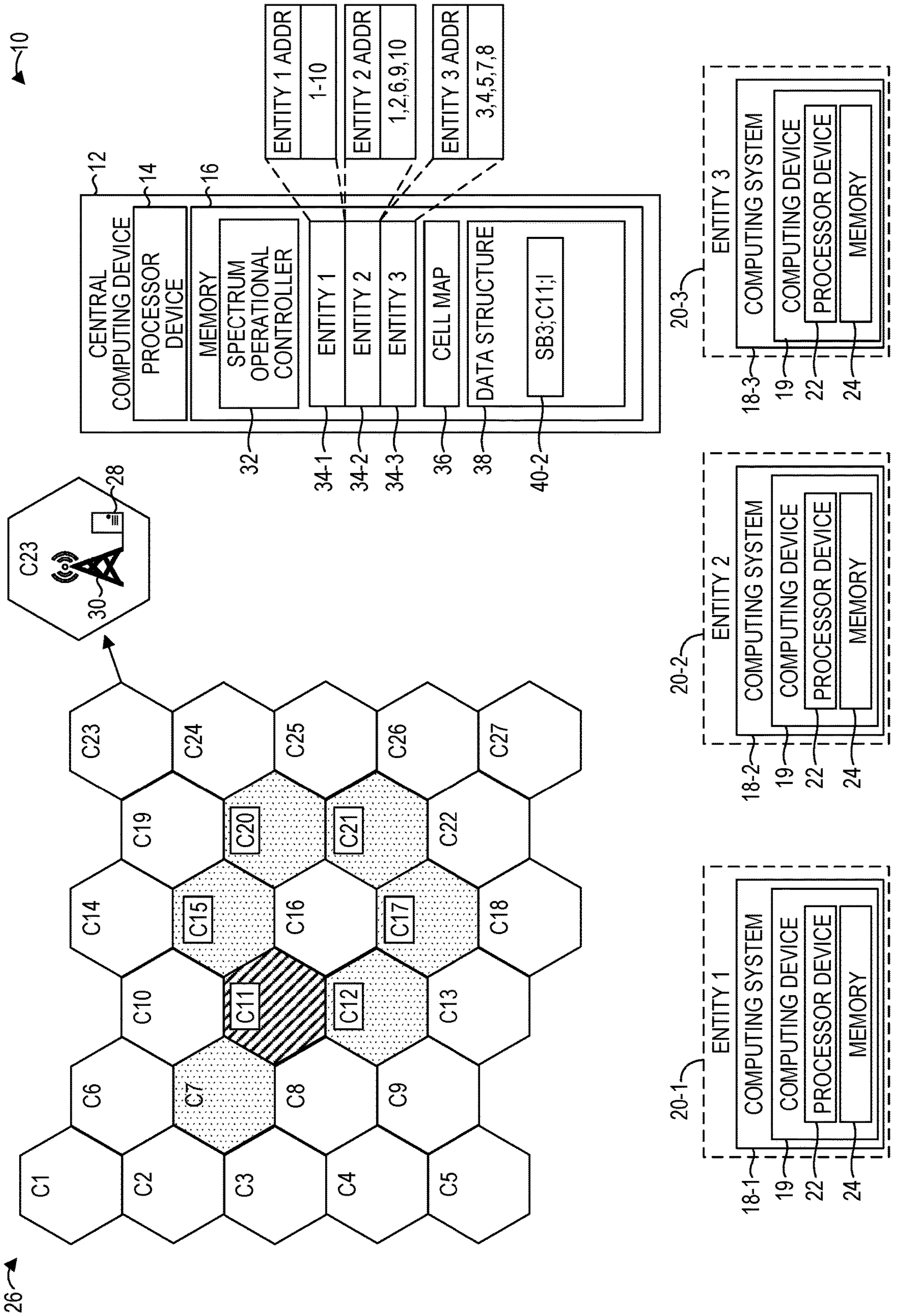

Referring now to FIG. 1D, the first entity computing system 18-1 sends an indication to the SOC 32 that the entity 20-1 requires use of the subband 3 of the wireless spectrum in the cell C11 immediately. The entity 20-1 may store an entry 40-2 in a data structure 38 that corresponds to the indication. The SOC 32 sends instructions to the computing system 18-3 to stop use of the subband 3 in the cell C11 immediately. Because the entity 20-3 had previously been instructed to stop use of the subband 3 in the cell C11 at some future point in time, and the entity 20-3 had begun the process of stopping use of the subband 3 in the cell C11, there may be fewer disruptions to user devices currently utilizing the subband 3 in the cell C11.

The SOC 32 may again determine one or more cells that are adjacent to the cell C11, and send instructions to the third entity 20-3 via the third entity computing system 18-3 to stop use of the subband 3 in the determined cells at a future point in time. Alternatively, the SOC 32 may, based on the two indications from the entity 20-1 being directed first to the cell C16 and then the cell C11, determine that the entity 20-1 is using the cells based on a particular direction, and may send instructions to the third entity 20-3 via the third entity computing system 18-3 to stop use of the subband 3 in the cell C7 at a future point in time.

The SOC 32 may determine that the first entity 20-1 has stopped use of the cell C16. The SOC 32 may make this determination in response to receiving a message from the first entity computing system 18-1 indicating that the entity 20-1 is no longer using the subband 3 in the cell C16. In some embodiments, the SOC 32 may periodically poll the first entity computing system 18-1 and ask whether the entity 20-1 continues to need the use of the subband 3 in the cell C16. In response, the SOC 32 deletes the entry 40-1, and sends a message to the third entity computing system 18-3 indicating that the entity 20-1 is no longer using the subband 3 in the cell C16. The entity 20-3 may then begin use of the subband 3 in the cell C16.

For cells that the SOC 32 has proactively requested the third entity computing device 18-3 to stop use of, at a future point in time, such as the cells C7, C12, C15, C17, C20, and C21, the SOC 32 may set a timer and, upon expiration, for each such cell that the SOC 32 has not received a request from the entity computing system 18-1 to use, send a message to the third entity computing device 18-3 that the subband 3 can now be fully utilized in such cells.

Because the SOC 32 is a component of the central computing device 12, functionality implemented by the SOC 32 may be attributed to the central computing device 12 generally. Moreover, in examples where the SOC 32 comprises software instructions that program the processor device 14 to carry out functionality discussed herein, functionality implemented by the SOC 32 may be attributed herein to the processor device 14.

Figure 2:
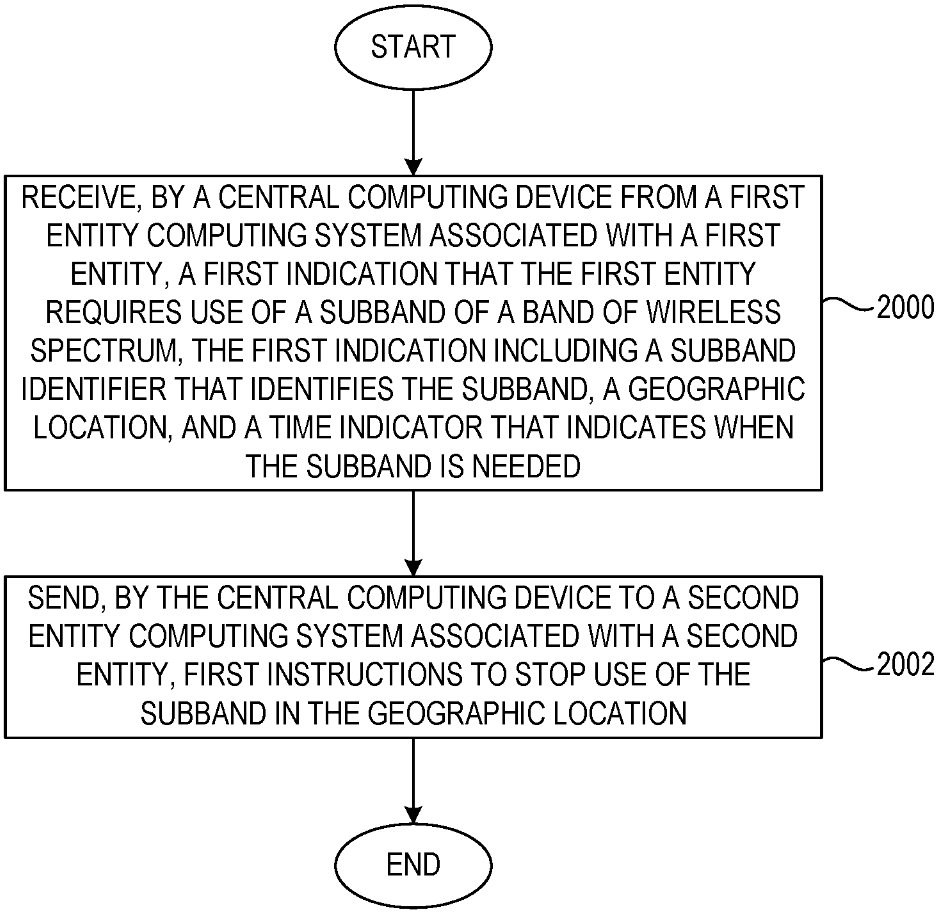
FIG. 2 is a flowchart of a method for common spectrum management in coexisting wireless networks according to one embodiment.

FIG. 2 is a flowchart of a method for common spectrum management in coexisting wireless networks according to one embodiment. FIG. 2 will be discussed in conjunction with FIGS. 1A-1D. The central computing device 12 receives, from the first entity computing system 18-1 associated with the first entity 20-1, an indication that the first entity 20-1 requires use of the subband 1 of the wireless spectrum, the indication including a subband identifier that identifies the subband 1, a geographic location such as a location of the cell C16, and a time indicator that indicates when the subband is needed, such as immediately or at a future point in time (FIG. 2, block 2000). The central computing device 12 sends, to the second entity computing system 18-2 associated with the second entity 20-2, instructions to stop use of the subband 1 in the cell C16 (FIG. 2, block 2002).

Figure 3:
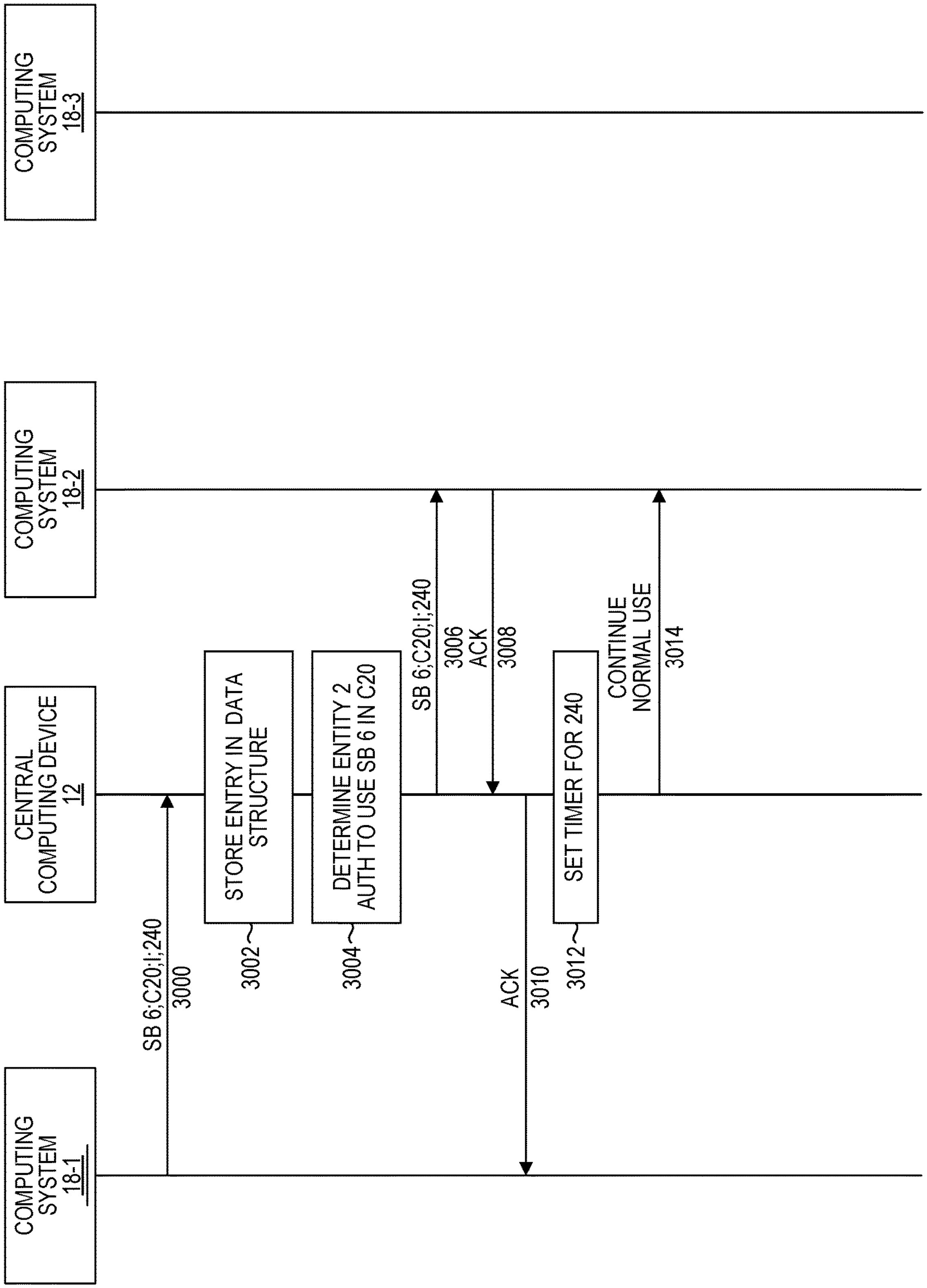
FIG. 3 is a sequence diagram illustrating messages communicated between and actions taken by various of the components illustrated in FIGS. 1A-1D according to another example of common spectrum management in coexisting wireless networks.

FIG. 3 is a sequence diagram illustrating messages communicated between and actions taken by various of the components illustrated in FIGS. 1A-1D according to another example of common spectrum management in coexisting wireless networks. In this example, the first entity computing system 18-1 sends an indication to the central computing device 12 that indicates that the first entity 20-1 requires immediate use of subband 6 in cell C20 for 240 seconds (step 3000). The central computing device 12 stores an entry including the indication in the data structure 38 (step 3002). The central computing device 12 determines that the entity 20-2 is authorized to use the subband 6 in the cell C20 (step 3004). The central computing device 12 sends instructions to the second entity computing system 18-2 to stop use of the subband 6 in the cell C20 immediately for 240 seconds (step 3006). The second entity computing system 18-2 responds with an acknowledgement indicating that the second entity computing system 18-2 has stopped use of the subband 6 in the cell C20 (step 3008). The central computing device 12 sends an acknowledgement to the first entity computing system 18-1 indicating that the subband 6 in the cell C20 is available for use (3010). The central computing device 12 sets a timer for 240 seconds (step 3012). When the timer expires, the central computing device 12 sends a message to the second entity computing system 18-2 indicating that the subband 6 in the cell C20 is again available for use by the second entity 20-2 (step 3014). In other embodiments, the computing system 18-2 may set a timer for 240 seconds, and may resume use after expiration of the timer without the need for an instruction from the central computing device 12.

Figure 4:
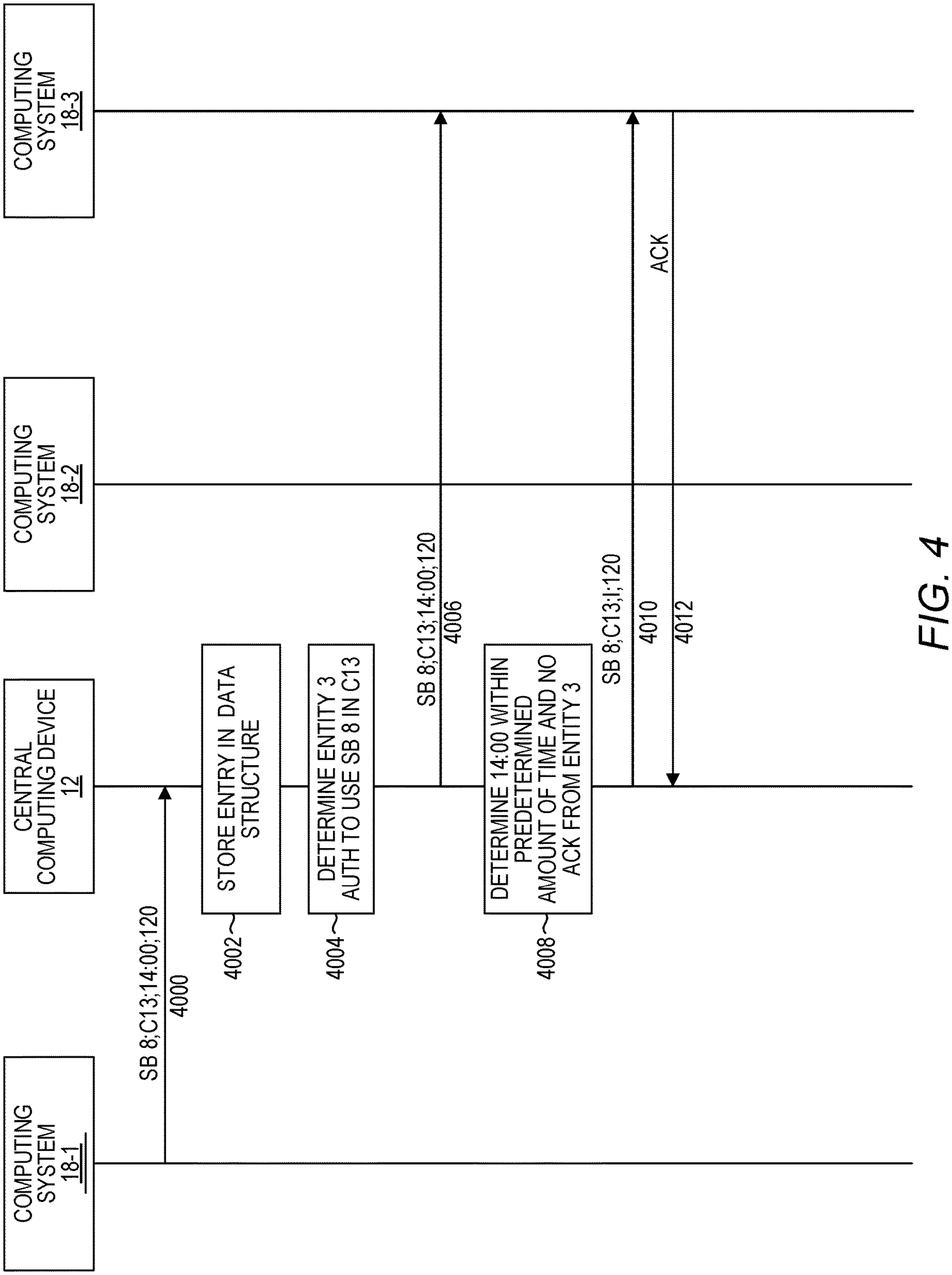
FIG. 4 is a sequence diagram illustrating messages communicated between and actions taken by various of the components illustrated in FIGS. 1A-1D according to another example of common spectrum management in coexisting wireless networks.

FIG. 4 is a sequence diagram illustrating messages communicated between and actions taken by various of the components illustrated in FIGS. 1A-1D according to another example of common spectrum management in coexisting wireless networks. In this example, the first entity computing system 18-1 sends an indication to the central computing device 12 that indicates that the first entity 20-1 requires use of subband 8 in the cell C13 at 14:00 for 120 seconds (step 4000). The central computing device 12 stores an entry including the indication in the data structure 38 (step 4002). The central computing device 12 determines that the entity 20-3 is authorized to use the subband 8 in the cell C13 (step 4004). The central computing device 12 sends instructions to the third entity computing system 18-3 to stop use of the subband 8 in the cell C13 at 14:00 for 120 seconds (step 4006). In this embodiment, the central computing device 12 expects an acknowledgement from the third entity computing system 18-3 at some time prior to 14:00 that indicates that the subband 8 in the cell C13 is available for use at 14:00.

The central computing device 12 determines that 14:00 is within a predetermined amount of time from the current time, and that the central computing device 12 has not received an acknowledgement from the third entity computing system 18-3 (step 4008). The central computing device 12 sends instructions to the third entity computing system 18-3 that the first entity 20-1 requires use of the subband 8 in the cell C13 immediately for 120 seconds (step 4010). The third entity computing system 18-3 responds with an acknowledgement indicating that the third entity computing system 18-3 has stopped (or will stop) use of the subband 8 in the cell C13 at 14:00 (step 4012).

Figure 5:
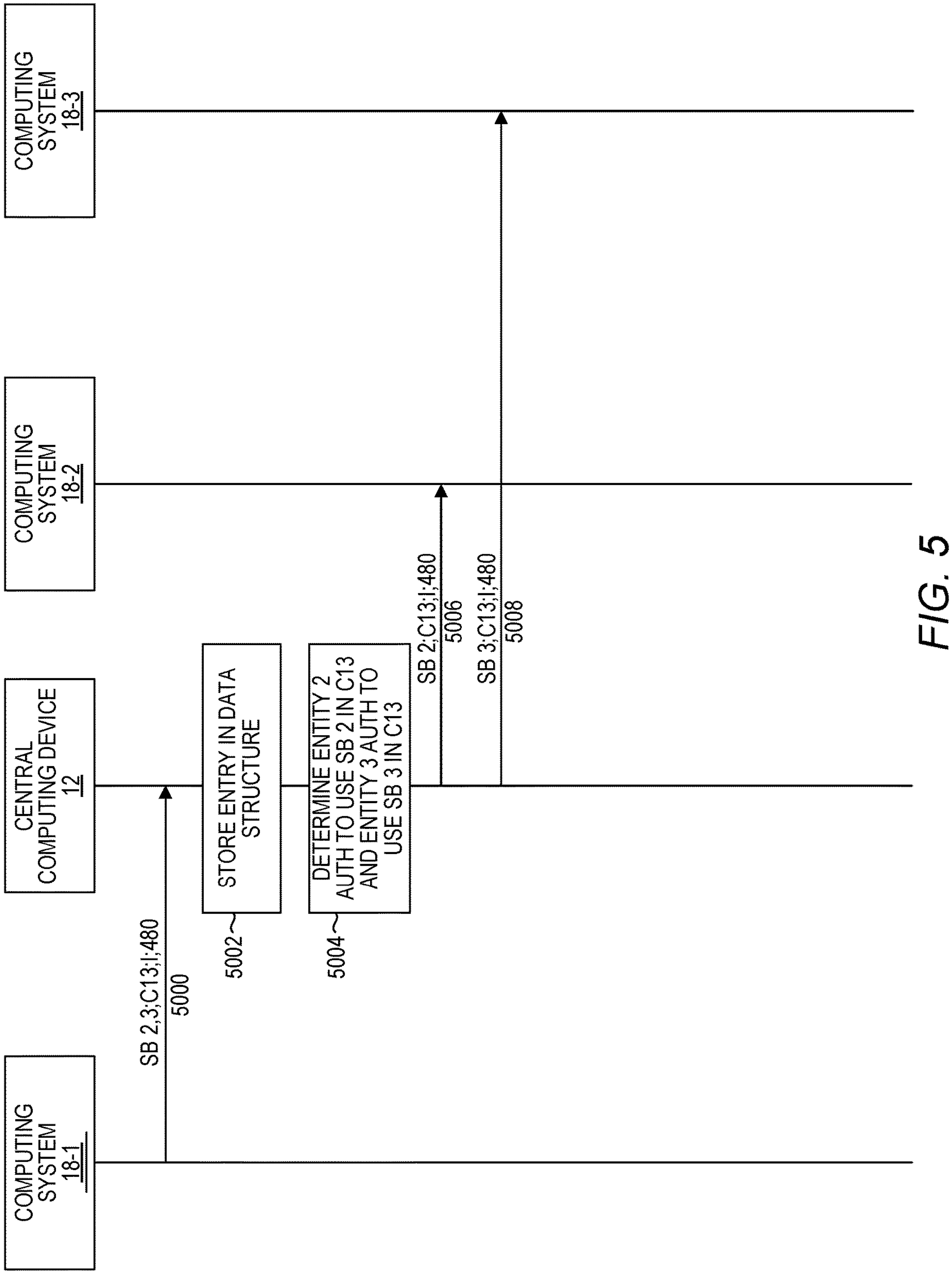
FIG. 5 is a sequence diagram illustrating messages communicated between and actions taken by various of the components illustrated in FIGS. 1A-1D according to another example of common spectrum management in coexisting wireless networks.

FIG. 5 is a sequence diagram illustrating messages communicated between and actions taken by various of the components illustrated in FIGS. 1A-1D according to another example of common spectrum management in coexisting wireless networks. In this example, the first entity computing system 18-1 sends an indication to the central computing device 12 that indicates that the first entity 20-1 requires use of subbands 2 and 3 in the cell C13 immediately for 480 seconds (step 5000). The central computing device 12 stores an entry including the indication in the data structure 38 (step 5002). The central computing device 12 determines that the entity 20-2 is authorized to use the subband 2 in the cell C13 and that the entity 20-3 is authorized to use the subband 3 in the cell C13 (step 5004). The central computing device 12 sends instructions to the second entity computing system 18-2 to stop use of the subband 2 in the cell C13 immediately for 480 seconds (step 5006). The central computing device 12 sends instructions to the third entity computing system 18-3 to stop use of the subband 3 in the cell C13 immediately for 480 seconds (step 5008). In this example, the system operates in an “open loop” methodology and the central computing device 12 assumes that the entity computing systems 18-2 and 18-3 implement instructions sent by the central computing device 12, and thus acknowledgements are not expected.

Figure 6:
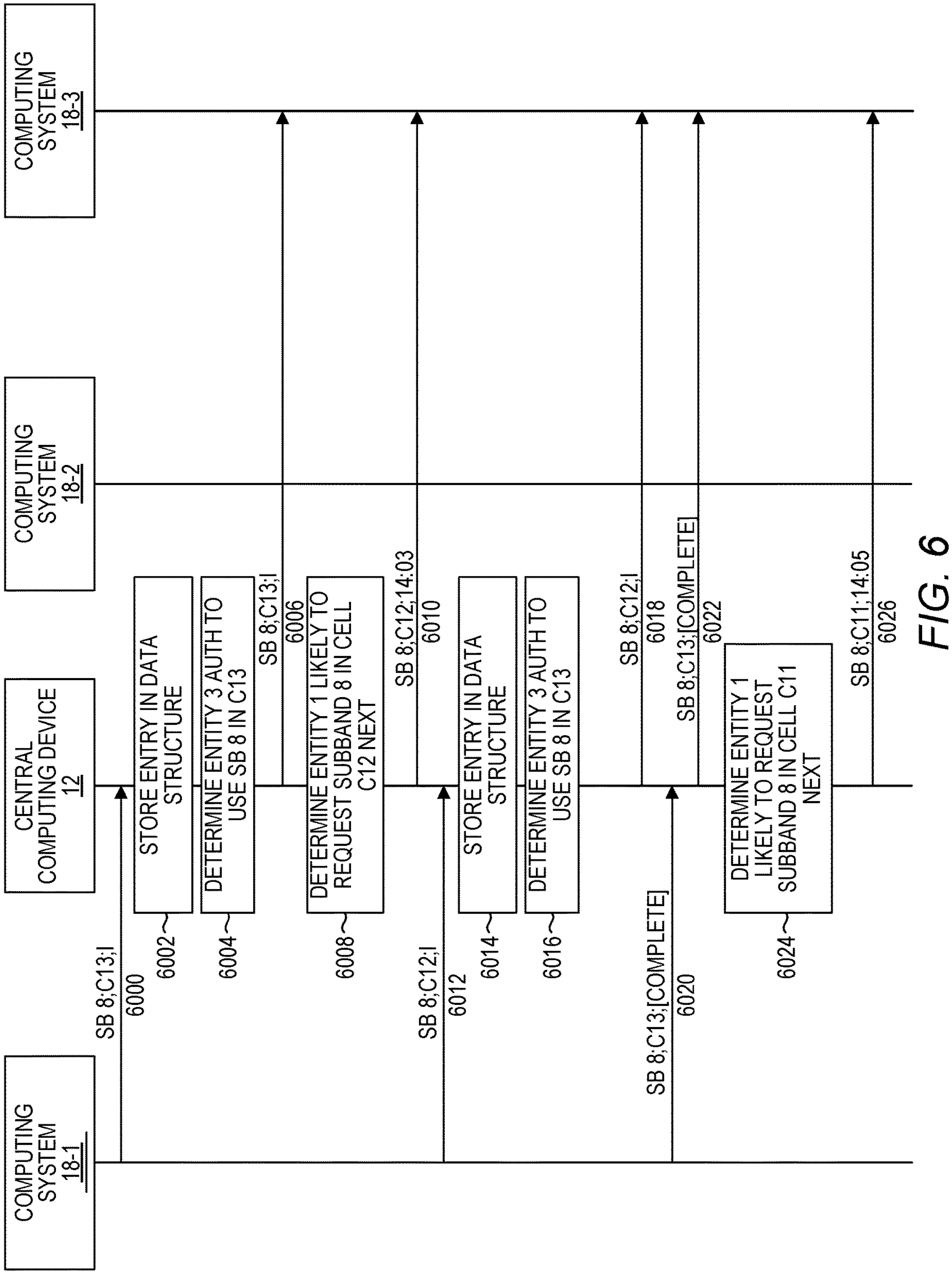
FIG. 6 is a sequence diagram illustrating messages communicated between and actions taken by various of the components illustrated in FIGS. 1A-1D according to another example of common spectrum management in coexisting wireless networks.

FIG. 6 is a sequence diagram illustrating messages communicated between and actions taken by various of the components illustrated in FIGS. 1A-1D according to another example of common spectrum management in coexisting wireless networks. In this example, the first entity computing system 18-1 sends an indication to the central computing device 12 that indicates that the first entity 20-1 requires use of subband 8 in cell C13 immediately for an indeterminate period of time (e.g., by omitting a time period) (step 6000). The central computing device 12 stores an entry including the indication in the data structure 38 (step 6002). The central computing device 12 determines that the entity 20-3 is authorized to use the subband 8 in the cell C13 (step 6004). The central computing device 12 sends an instruction to the third entity computing system 18-3 to stop use of the subband 8 in the cell C13 immediately for an indeterminate period of time (step 6006). In this example, the system operates in an “open loop” methodology and the central computing device 12 assumes that the third entity computing system 28-3 implements instructions sent by the central computing device 12, and thus acknowledgements are not expected.

The central computing device 12 determines that the first entity computing system 18-1 is likely to request immediate access of the subband 8 in the cell C12 next (step 6008). This determination may be made, for example, based on historical indications received from the first entity computing system 18-1, or based on an immediately preceding series of indications received from the first entity computing system 18-1. The central computing device 12 sends an instruction to the third entity computing system 18-3 to stop use of the subband 8 in the cell C12 at a future point in time that is two minutes from the current point in time (step 6010).

The first entity computing system 18-1 then sends an indication to the central computing device 12 that indicates that the first entity 20-1 requires use of subband 8 in cell C12 immediately for an indeterminate period of time (step 6012). The central computing device 12 stores an entry including the indication in the data structure 38 (step 6014). The central computing device 12 determines that the entity 20-3 is authorized to use the subband 8 in the cell C13 (step 6016). The central computing device 12 sends an instruction to the third entity computing system 18-3 to stop use of the subband 8 in the cell C12 immediately for an indeterminate period of time (step 6018).

The first entity computing system 18-1 then sends a message to the central computing device 12 that indicates that the first entity 20-1 no longer requires use of the subband 8 in the cell C13 (step 6020). The central computing device 12 sends a message to the third entity computing system 18-3 that indicates that the first entity 20-1 no longer requires use of the subband 8 in the cell C13 (step 6022).

The central computing device 12 determines that the first entity computing system 18-1 is likely to request immediate access of the subband 8 in the cell C11 next (step 6024). The central computing device 12 sends an instruction to the third entity computing system 18-3 to stop use of the subband 8 in the cell C11 at a future point in time that is two minutes from the current point in time (step 6026).

Figure 7:
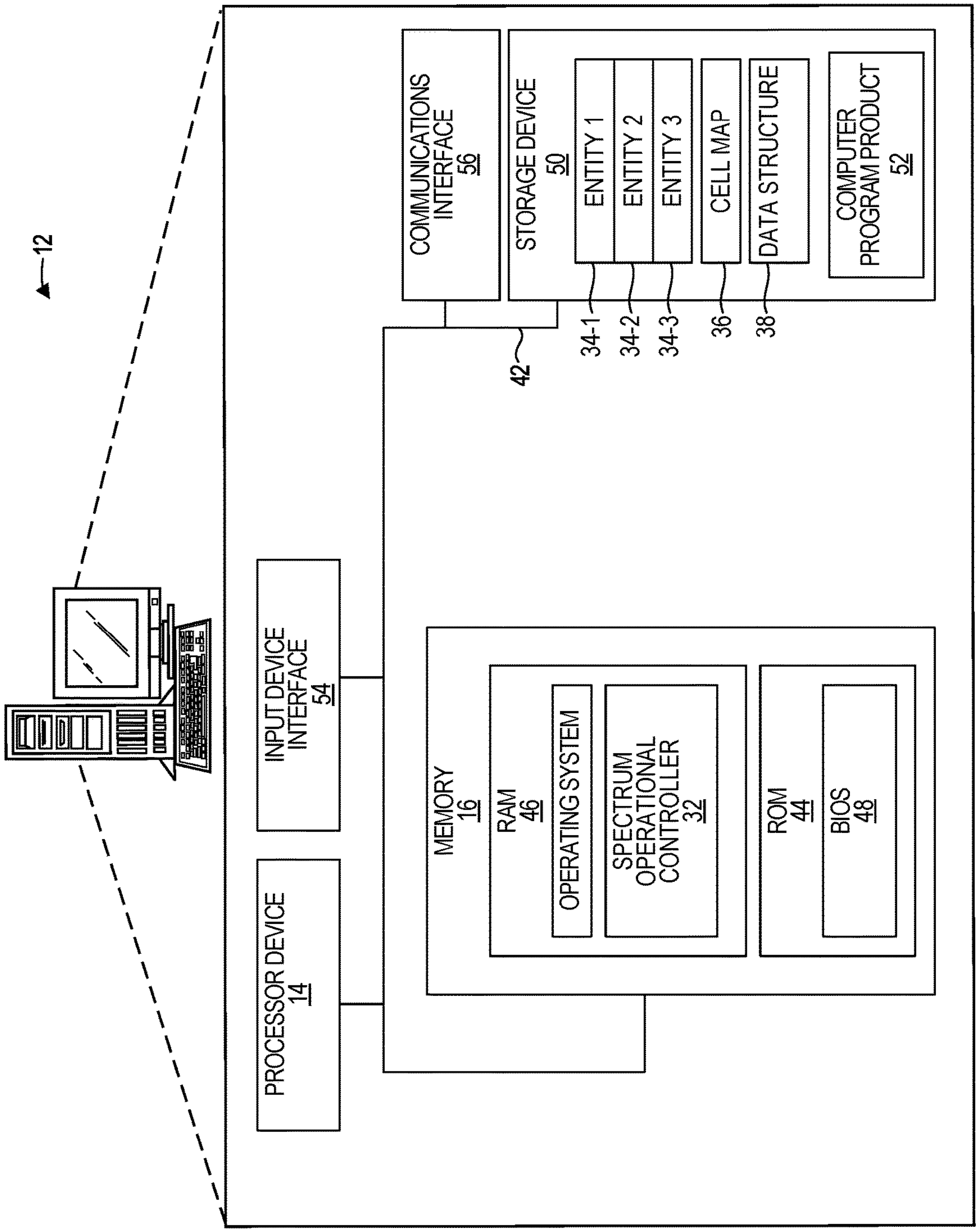
FIG. 7 is a block diagram of a central computing device suitable for implementing examples according to one example.

FIG. 7 is a block diagram of the central computing device 12 suitable for implementing examples according to one example. The central computing device 12 may comprise any computing or electronic device capable of including firmware, hardware, and/or executing software instructions to implement the functionality described herein, such as a computer server, or the like. The central computing device 12 includes the processor device 14, the system memory 16, and a system bus 42. The system bus 42 provides an interface for system components including, but not limited to, the system memory 16 and the processor device 14. The processor device 14 can be any commercially available or proprietary processor.

The system bus 42 may be any of several types of bus structures that may further interconnect to a memory bus (with or without a memory controller), a peripheral bus, and/or a local bus using any of a variety of commercially available bus architectures. The system memory 16 may include non-volatile memory 44 (e.g., read-only memory (ROM), erasable programmable read-only memory (EPROM), electrically erasable programmable read-only memory (EEPROM), etc.), and volatile memory 46 (e.g., random-access memory (RAM)). A basic input/output system (BIOS) 48 may be stored in the non-volatile memory 44 and can include the basic routines that help to transfer information between elements within the central computing device 12. The volatile memory 46 may also include a high-speed RAM, such as static RAM, for caching data.

The central computing device 12 may further include or be coupled to a non-transitory computer-readable storage medium such as a storage device 50, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 50 and other drives associated with computer-readable media and computer-usable media may provide non-volatile storage of data, data structures, computer-executable instructions, and the like.

A number of modules can be stored in the storage device 50 and in the volatile memory 46, including an operating system and one or more program modules, such as the SOC 32, which may implement the functionality described herein in whole or in part. All or a portion of the examples may be implemented as a computer program product 52 stored on a transitory or non-transitory computer-usable or computer-readable storage medium, such as the storage device 50, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the SOC 32 in the volatile memory 46, may serve as a controller, or control system, for the central computing device 12 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 14 through an input device interface 54 that is coupled to the system bus 42 but can be connected by other interfaces such as a parallel port, an Institute of Electrical and Electronic Engineers (IEEE) 1394 serial port, a Universal Serial Bus (USB) port, an IR interface, and the like. The central computing device 12 may also include a communications interface 56 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method, comprising:

receiving, by a computing device from a first entity computing system associated with a first entity, a first indication that the first entity requires use of a subband of a band of wireless spectrum, the first indication including a subband identifier that identifies the subband, a geographic location, and a time indicator that indicates when the subband is needed; and sending, by the computing device to a second entity computing system associated with a second entity, first instructions to stop use of the subband in the geographic location.

2. The method of claim 1 wherein the time indicator indicates that the first entity requires immediate use of the subband, and wherein the first instructions indicate that the second entity is to stop use of the subband immediately.

3. The method of claim 2 wherein the time indicator indicates a period of time for which the first entity requires use of the subband, and wherein the first instructions indicate that the second entity is to stop use of the subband immediately for the period of time.

4. The method of claim 1 wherein the time indicator indicates that the first entity requires use of the subband at a future point in time, and wherein the first instructions indicate that the second entity is to stop use of the subband at the future point in time.

5. The method of claim 4 wherein the time indicator indicates a period of time for which the first entity requires use of the subband, and wherein the first instructions indicate that the second entity is to stop use of the subband at the future point in time for the period of time.

6. The method of claim 4 further comprising:
determining, by the computing device, that the future point in time is within a predetermined amount of time in the future;
determining, by the computing device, that the computing device has not received a reply from the second entity indicating that the second entity has stopped use of the subband; and
sending, by the computing device to the second entity computing system, instructions indicating that the second entity is to stop use of the subband immediately.

7. The method of claim 1 wherein the geographic location comprises a first cell, and further comprising:
determining, by the computing device, a second cell that is adjacent to the first cell; and
sending instructions to the second entity computing system to stop use of the subband in the second cell.

8. The method of claim 7 wherein the instructions are part of the first instructions.

9. The method of claim 7 wherein the instructions are sent to the second entity computing system subsequent to sending the first instructions.

10. The method of claim 7 wherein the time indicator indicates that the first entity requires immediate use of the subband, and wherein the instructions indicate that the second entity is to stop use of the subband in the second cell at a future point in time.

11. The method of claim 1 wherein the geographic location comprises a first cell, and further comprising:
determining, by the computing device, a plurality of second cells that are adjacent to the first cell, and sending instructions to the second entity computing system to stop use of the subband in the plurality of second cells.

12. The method of claim 11 wherein the instructions indicate that the second entity is to stop use of the subband in a first subset of the plurality of second cells immediately, and stop use of the subband in a second subset of the plurality of second cells at a future point in time.

13. The method of claim 1 further comprising:
determining, by the computing device, that the first entity has finished use of the subband in the geographic location; and
sending, by the computing device to the second entity computing system, a message indicating that the first entity is no longer using the subband in the geographic location.

14. The method of claim 13 wherein determining that the first entity has finished use of the subband in the geographic location comprises receiving, by the computing device from the first entity computing system, a message indicating that the first entity is no longer using the subband in the geographic location.

15. The method of claim 1 further comprising:
prior to sending, to the second entity computing system, the first instructions to stop use of the subband in the geographic location, accessing, by the computing device, information that correlates each of a plurality of subbands of the band of wireless spectrum to a particular entity of a plurality of different entities; and
determining, by the computing device, that the subband is correlated to the second entity.

16. The method of claim 1 wherein the indication includes a first subband identifier and a second subband identifier, and further comprising:
determining, by the computing device, that the first subband identifier is associated with the second entity and the second subband identifier is associated with a third entity; and
wherein sending, by the computing device to the second entity computing system associated with the second entity, the first instructions to stop use of the subband in the geographic location further comprises:
sending, by the computing device to the second entity computing system associated with the second entity, the first instructions to stop use of a first subband in the geographic location; and
sending, by the computing device to a third entity computing system associated with the third entity, the first instructions to stop use of a second subband in the geographic location.

17. The method of claim 1 wherein the geographic location comprises a first cell, and wherein the time indicator indicates that the first entity requires immediate use of the subband in the first cell, and wherein the first instructions indicate that the second entity is to stop use of the subband in the first cell immediately, and further comprising:
determining, by the computing device, a second cell that is adjacent to the first cell;
sending, to the second entity computing system, instructions to stop use of the subband in the second cell at a future point in time;
receiving, by the computing device, a second indication that the first entity requires immediate use of the subband in the second cell; and
sending, to the second entity computing system, instructions to immediately stop use of the subband in the second cell.

18. A computing device, comprising:
a memory; and
a processor device coupled to the memory and operable to:
receive, from a first entity computing system associated with a first entity, a first indication that the first entity requires use of a subband of a band of wireless spectrum, the first indication including a subband identifier that identifies the subband, a geographic location, and a time indicator that indicates when the subband is needed; and
send, to a second entity computing system associated with a second entity, first instructions to stop use of the subband in the geographic location.

19. The computing device of claim 18 wherein the geographic location comprises a first cell, and wherein the processor device is further operable to:
determine a second cell that is adjacent to the first cell; and
send instructions to the second entity computing system to stop use of the subband in the second cell.

20. A non-transitory computer-readable storage medium that includes executable instructions operable to cause a processor device to:
receive, from a first entity computing system associated with a first entity, a first indication that the first entity requires use of a subband of a band of wireless spectrum, the first indication including a subband identifier that identifies the subband, a geographic location, and a time indicator that indicates when the subband is needed; and send, to a second entity computing system associated with a second entity, first instructions to stop use of the subband in the geographic location.

* * * * *